May 7, 1935.  K. M. LEDERER  2,000,489
THERMOCOUPLE MOUNTING
Filed Oct. 16, 1931
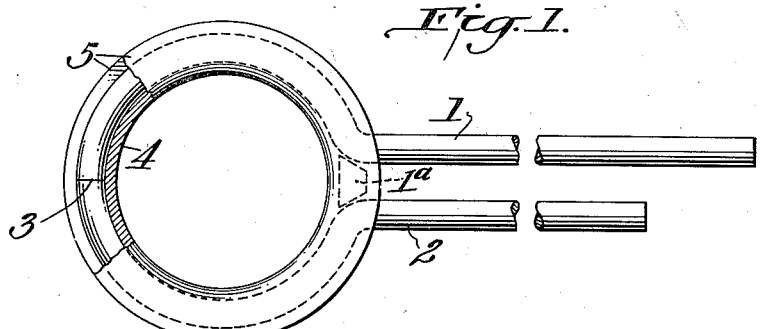
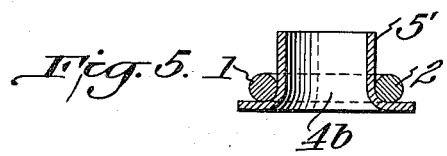
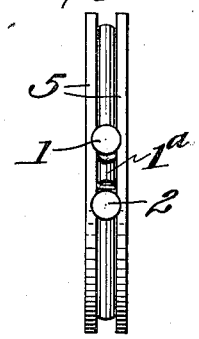
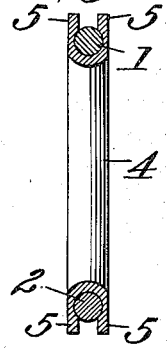
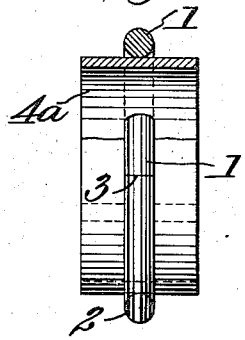
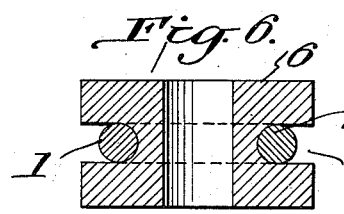
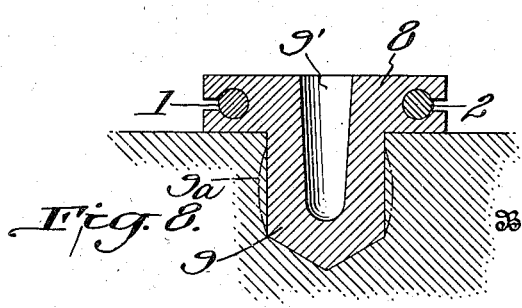
Inventor:
Karl M. Lederer,
By Byrnes Townsend & Potter,
Attorneys.

Patented May 7, 1935

2,000,489

UNITED STATES PATENT OFFICE 2,000,489

THERMOCOUPLE MOUNTING

Karl M. Lederer, Newark, N. J., assignor to Weston Electrical Instrument Corporation, Newark, N. J., a corporation of New Jersey Application October 16, 1931, Serial No. 569,347

9 Claims. (Cl. 136—4)

This invention relates to thermocouples and more particularly to supports or mountings for thermocouples and to methods of securing thermocouples to mountings which may be readily secured to an engine or other body whose temperature is to be observed.

Thermocouples and appropriate electrical measuring instruments have been employed for the measurement of temperatures and, in recent years, such systems have been frequently employed for maintaining a constant and convenient supervision upon the temperature of gas engines used on aircraft. A single instrument on the pilot's panel can, by suitable switching arrangements, register the temperature at different points on one or more cylinders. The practice has been to braze the couple wires, usually iron and constantan wires, to a small copper washer or to surround the wires by a small copper bushing that was driven into openings in the cylinder head or base.

Such thermocouple mountings have not been entirely satisfactory and an object of the present invention is to provide a thermocouple mounting which does not affect the electrical properties of the couple and does not impair the mechanical strength of the couple. More particularly, an object is to provide a thermocouple mounting in the form of a tube, washer or hollow rivet, the junction of the couple and a substantial portion of the wires adjacent the junction being seated in a groove in the edge of the rivet. Other objects are to provide methods of manufacturing thermocouple mountings which constitute rugged supports for the thermocouples.

These and other objects of the invention will be apparent from the following specification, when taken with the accompanying drawing, in which:

Fig. 1 is a plan view of one embodiment of the invention with parts broken away;

Fig. 2 is an end view of the mounted thermocouple;

Fig. 3 is a transverse section;

Fig. 4 is an end view with parts in section illustrating an intermediate step in the formation of a thermocouple mounting such as shown in Fig. 1;

Fig. 5 is a sectional view illustrating another method of forming the thermocouple mounting;

Fig. 6 is a transverse section through another embodiment of the invention, the parts being shown in an intermediate stage in the formation of the mounting;

Fig. 7 is a transverse section through the finished mounting; and

Fig. 8 is a transverse section illustrating another form of the invention.

In the drawing, the numerals 1, 2 identify the two wires of the thermocouple whose junction 3 is to be maintained in close thermal contact with the spark plugs, engine or other body whose temperature is to be determined. The joined ends of the wires are shaped to the form of an incomplete annulus through which the hollow rivet 4 passes, the ends 5 of the rivet being bent over to enclose the couple wires.

As indicated in Fig. 3, the bending over of the end flanges 5 of the hollow rivet 4 is carried so far that the parts are mechanically interlocked to prevent relative movement of the couple wires and the washer. A short section of wire 1$^a$ is preferably arranged between the adjacent sections of the couple wires to prevent crushing or excessive deformation of the hollow rivet at the region where the wires 1, 2 pass from the same. With this arrangement the end flanges 5 are substantially parallel, and the thermocouple mounting may serve as a gasket to prevent escape of air or fluid from the parts between which it is clamped.

As indicated in Fig. 4, the hollow rivet may be formed by spinning or pressing back the ends of a short tubular sleeve 4$^a$, preferably of copper, that is inserted within the annulus or loop formed by the joined ends of the couple wires.

Alternatively, the hollow rivet 4$^b$ may have one end flange 5 formed before the rivet is inserted within the looped end of the thermocouple, as shown in Fig. 5. After inserting the shank of the hollow rivet 4$^b$ within the looped end of the thermocouple, the other flange 5' is turned over to mechanically interlock the hollow rivet with the thermocouple wires. As shown in Fig. 6, the mounting may comprise a heavy washer 6 which has a circumferential groove 7 of the same width as the diameter of the thermocouple wires. After placing the joined ends of the thermocouple wires within the groove and bending the same into an incomplete annulus, as indicated in Fig. 6, pressure is applied axially of the washer to deform the same to lock the thermocouple within the groove 7, as shown in Fig. 7.

Where it is not convenient or practical to clamp or bolt a washer type of thermocouple to the object under investigation, the mounting may conveniently take the form of a blind rivet, as shown in Fig. 8. The head 8 of the rivet is provided with a peripheral groove in which the couple is interlocked by deformation of the material of the head, and the shank 9 of the rivet has a bore 9' which may or may not be tapered which stops short of the end of the shank. The rivet is formed of a malleable heat-conducting metal or alloy, such as copper, soft iron or aluminum and, after insertion of the shank 9 in a blind hole tapped into a cylinder wall or the like, a punch or short pin is driven into the bore 9' to expand the shank 9, as indicated in exaggerated form by the dotted lines 9a. This method of securing the mounted thermocouple is particularly advantageous in the case of engines or other bodies which are subject to considerable vibration since the expansion of the shank 9 produces an interlocking which is not destroyed by the vibration.

Thermocouple mountings manufactured in accordance with the present invention provide for a rapid transfer of heat between the thermocouple and the engine or other body to which the thermocouple is secured. The spinning or pressing operations provide substantially parallel plane surfaces at opposite sides of the hollow rivet or washer mountings. A mounted thermocouple such as shown in Fig. 1 may be clamped between the spark plug and the cylinder wall, thus replacing the gasket customarily employed for securing a gas-tight fit between the plug and the cylinder. For use at other points on the engine, the diameter of the mounting may be considerably reduced and a thermocouple as shown in Fig. 7 may be clamped in by a short bolt passed through the opening in the washer, or the blind rivet type of Fig. 8 may be used in cases where vibration would tend to loosen a threaded connection.

While the drawing illustrates the preferred construction in which the mounting forms a washer of annular form, it will be apparent that the invention is not limited to this particular shape. Nor is it essential that the thermocouple wires be bent into the form of an approximately complete annulus, since the mounting washer and the wires may be mechanically interlocked when the wires extend around a much smaller portion of the circumference of the washer. It will be apparent that the invention is not restricted in any way to the particular temperature measurements which may be made, since the washer or rivet type of mounting provides a convenient means for attaching a thermocouple to articles or machines other than airplane engines.

I claim:

1. A mounted thermocouple comprising a tubular metal body having an external circumferential groove, and a thermocouple carried by and extending circumferentially about said metal body, said thermocouple having the junction thereof and the adjacent portions of the couple wires seated in said groove.

2. A mounted thermocouple comprising a thermocouple having portions of the wires thereof adjacent the thermocouple junction looped to form a partially closed figure, and a flanged member extending through the loop and having flanged edges overlying and mechanically interlocked with the same.

3. A mounted thermocouple comprising a mounting member having end flanges defining a circumferential recess, and a thermocouple having the junction and adjacent portions of the couple wires seated in said recess, the width of the mouth of the recess being less than the diameter of the couple wires, whereby the thermocouple and member are mechanically interlocked.

4. The method of forming a mounted thermocouple which comprises bending the joined ends of thermocouple wires to define an opening outlined by said wires, inserting a cylindrical body in said opening, and deforming said cylindrical body to mechanically interlock with said couple wires.

5. The method of securing a thermocouple to a mounting, which comprises forming the joined ends of the thermocouple wires into a loop surrounding the central portion of a cylindrical mounting, and deforming the ends of said mounting to clamp said looped end therebetween.

6. The method of securing a thermocouple to a mounting, which comprises forming the joined ends of the thermocouple wire into a loop, inserting a cylindrical sleeve within said loop, and pressing over the ends of said sleeve to form flanges at opposite sides of and mechanically interlocked with said loop end.

7. The method of securing a thermocouple to a washer, which comprises circumferentially grooving said washer to provide a recess having a width substantially equal to the diameter of the couple wires, placing the junction of said thermocouple in said recess and with the adjacent portions of the couple wires in said recess, and deforming said washer to interlock the same mechanically upon the portion of said thermocouple which is located in said recess.

8. A mounted thermocouple comprising a blind rivet having a head and a shank, said shank being counterbored from the head end of the rivet, and a thermocouple having the junction thereof and the adjacent portions of the wires mechanically interlocked to the rivet head.

9. A mounted thermocouple as stated in claim 8, wherein said rivet head has a circumferential groove, and said thermocouple junction and the adjacent portions of the wires are seated in said groove.

KARL M. LEDERER.